United States Patent [19]

Flower

[11] 4,181,432
[45] Jan. 1, 1980

[54] VELOCITY MEASURING SYSTEM

[75] Inventor: Robert A. Flower, White Plains, N.Y.

[73] Assignee: The Singer Company, Little Falls, N.J.

[21] Appl. No.: 952,374

[22] Filed: Oct. 18, 1978

[51] Int. Cl.² ............................................. G01P 3/36
[52] U.S. Cl. ..................................... 356/28; 180/178; 324/175; 343/8; 356/28.5
[58] Field of Search .............. 180/98, 105 E; 324/175; 356/28, 28.5; 343/8

[56] References Cited

U.S. PATENT DOCUMENTS

| | | | |
|---|---|---|---|
| 3,123,823 | 3/1964 | Schreitmueller | 343/8 |
| 3,344,632 | 10/1967 | Phillipson | 324/175 |
| 3,689,882 | 9/1972 | Dessailly | 180/98 |
| 3,921,749 | 11/1975 | Kawada | 180/98 |

Primary Examiner—S. C. Buczinski
Attorney, Agent, or Firm—Thomas W. Kennedy

[57] ABSTRACT

In order to provide a system for measuring relative velocity of a surface with the accuracy of a laser velocimeter but avoiding the problems associated with operating down to zero speed and with signal dropout during a run, a tachometer is coupled to measure the relative velocity and the output of the tachometer corrected using the output of the laser velocimeter thereby giving laser velocimeter accuracy over the major portion of the velocity range but still permitting operation down to zero speed and operation when signal dropout occurs.

9 Claims, 3 Drawing Figures

VELOCITY MEASURING SYSTEM

This invention relates to laser velocimeters in general and more particularly to a laser velocimeter which is capable of operating down to zero speed and avoids the possibility of signal dropout during a run.

Various laser velocimeters have been developed in the past. Typical of these are the velocimeters disclosed in U.S. Pat. No. 3,432,237 and U.S. Pat. No. 3,525,569. In a laser velocimeter, a source of radiation such as a laser, directs a substantially monochromatic beam toward a reference surface. The reflected radiation is passed through an optical aperture or plurality of slits located near the source and received by a photomultiplier tube which has its anode connected to a frequency meter, the output of which is a function of the relative velocity between the radiation source and a reflecting surface.

Two limitations which are encountered in laser velocimeter applications are the incapability of operating down to zero speed and the possibility of signal dropout during a run. A further general problem is the delay incurred at the start of a run during which time the frequency tracker searches for the signal, i.e., the time to complete acquisition and begin tracking. That is to say, in a more complex system, rather than using a simple frequency meter, a frequency tracker which is adapted to lock onto the signal is utilized. As is well known, frequency trackers require certain acquisition time before they lock on and begin tracking. Furthermore, there are applications to industrial processes as well as to vehicle navigation in which, although true zero speed operation is not required, the measurements to be made involve length or distance. In such applications, good accuracy is impossible using a velocimeter alone. The same is true with respect to signal dropout which may not be possible to eliminate completely. Unquestionably, such signal dropout could result in a complete destruction of the accuracy of a distance measurement.

Thus, the need for an improved velocimeter which is capable of operating down to zero speed and which avoids problems associated with signal dropout during a run, becomes evident.

SUMMARY OF THE INVENTION

The present invention provides such a device. In essence, the system of the present invention accomplishes this by using the laser velocimeter as a velocity reference in a feedback loop around a tachometer connected mechanically to the moving strip, in the case of an industrial measurement or to the vehicle drive train, in the case of a vehicle. A tachometer operates down to zero speed without difficulty. However, it will not provide adequate accuracy by itself. Thus, in the system of the present invention, the laser velocimeter corrects the tachometer errors at all speeds in the range of the velocimeter. If dropout occurs, the tachometer continues to provide an output, using the last remembered correction from the velocimeter. An electrical analog of speed supplied by the tachometer is used directly or as a control for the local oscillator in the frequency tracker of the laser velocimeter. This places the tracking filter of the frequency tracker at or near the correct frequency at all times thereby eliminating the need for a search with its attendant time delay during acquisition.

DETAILED DESCRIPTION OF THE INVENTION

Figure 1:
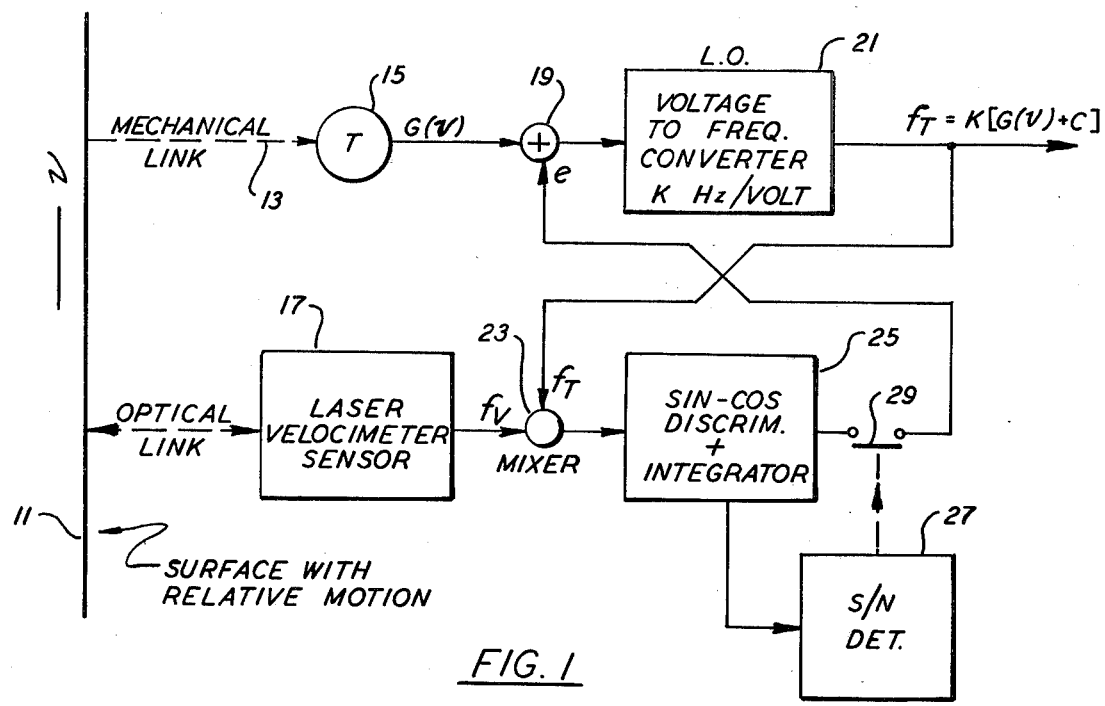
FIG. 1 is a block diagram of the basic configuration of the velocimeter of the present invention.

In FIG. 1, a surface 11 exhibiting relative motion with respect to the velocimeter is illustrated. This surface could be the ground below a vehicle such as a jeep, for example, or could be a moving belt in an industrial process, for example. In either case, an accurate measurement of velocity of relative motion, along with possibly a measurement of distance, i.e., the integral of velocity, is required. In accordance with the present invention, there is a mechanical linkage 13 to a tachometer 15. In the case of a moving belt, the tachometer would be mechanically coupled to the belt. In the case of a vehicle, the tachometer will be coupled to the drive system of the vehicle. Also provided is a laser velocimeter sensor 17 which can be constructed in accordance with either or both of the aforementioned patents. The output of the tachometer 15 which is designated as a function G [v] is summed in a summing junction 19 with a signal designated e, to be described in more detail below. The output from this summing junction is the input to a voltage to frequency converter 21 which performs the function of a local oscillator for frequency tracking the frequency output of the laser velocimeter sensor 17. The voltage to frequency converter must be capable of operating down to zero frequency. A circuit suitable for this application is described in *Engineering Design News*, June 5, 1974, pp. 49 to 54. The output of the voltage to frequency converter 21, in addition to fulfilling its function as a local oscillator, also supplies a continuous frequency analog of speed, i.e., the function K [G (v)+e] where e is the correction to the tachometer output obtained from the laser velocimeter sensor 17. The output from the voltage to frequency converter 21 is fed to a mixer 23 where it is mixed with the output of the laser velcoimeter sensor. At operating speeds within the normal range of the laser velocimeter sensor 17, a signal $f_v$ is available. It is mixed with the local oscillator signal $f_T$ and then processed in a sine-cosine descriminator 25 in a manner commonly used in frequency tracking. A signal to noise ratio detector 27 monitors the quality of the signal holding the feedback path open by means of a switch 29 [shown as a mechanical switch but preferably a semi-conductor switch] when the signal to noise ratio is below a threshold and closing the loop when the signal to noise ratio is adequate. The output of the sine-cosine discriminator and integrator is an error signal, e, representing the difference between the frequency $f_v$ and the frequency $f_T$. This signal is fed back to the summing junction 19 and used to adjust the frequency of the output of the voltage to frequency converter 21 until $f_T$ equals $f_v$.

Figure 2:
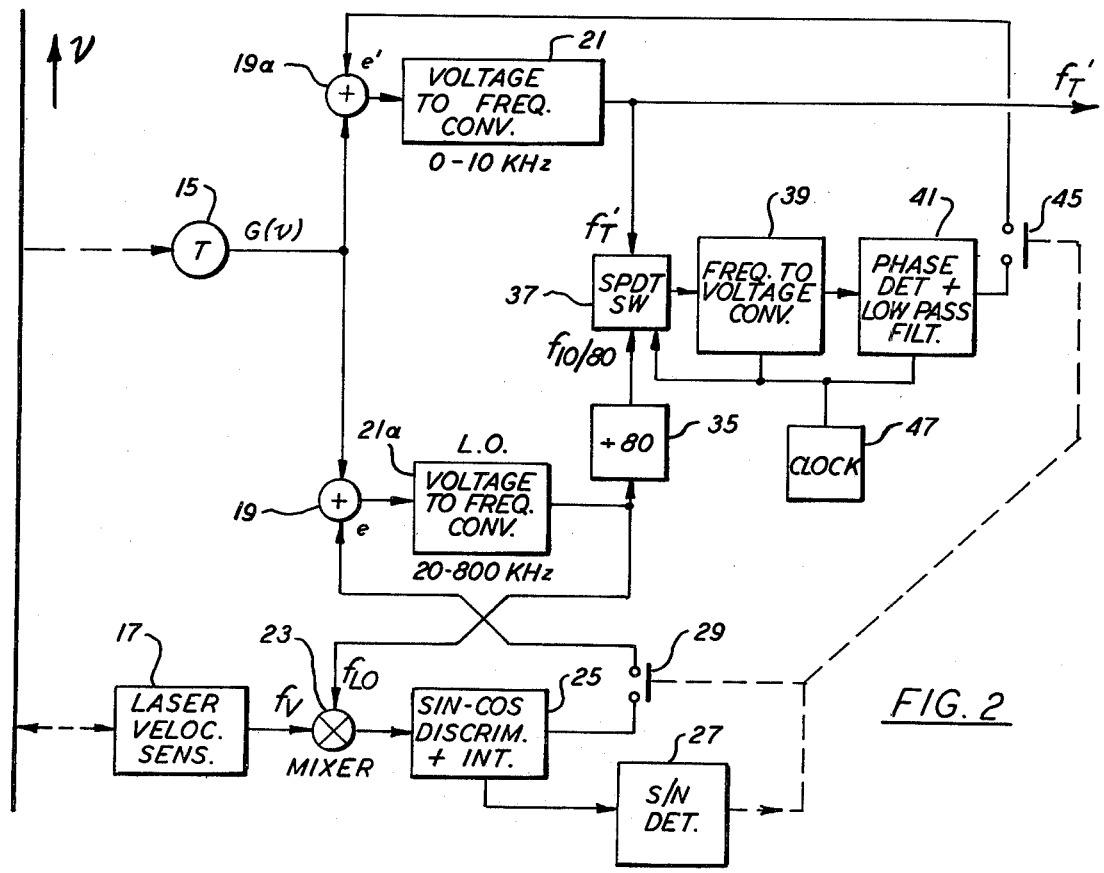
FIG. 2 is a block diagram illustrating the velocimeter with separate voltage to frequency converters.

FIG. 2 illustrates an alternate embodiment of the present invention. The tachometer 15, laser velocimeter sensor 17, mixer 23, sine-cosine discriminator and integrator 25, signal to noise detector 27 and switch 29 are as in the previous embodiment. The primary difference in this embodiment is that separate voltage to frequency converters are utilized for providing the output frequency designated f'$_T$ and as the local oscillator. However, the two frequencies are locked together in frequency. The reason for using this embodiment is that presently available voltage to frequency converters which have a zero frequency capability are limited to a maximum frequency of about ten KHZ whereas the local oscillator frequency in standard velocimeter trackers must operate up to 800 KHZ. This requires separating the two functions if the normal operating frequency of the standard velocimeter is to be used. In this arrangement. the output of the tachometer is again provided to a summing junction 19 at the input to a voltage to frequency converter 21a. However, this voltage to frequency converter 21a only has a range of 20 to 800 KHZ. This summing junction is fed with the error signal from the sine-cosine discriminator and integrator 25 through the switch 29 and supplies its output back to the mixer 23 as before. Its output is then divided by 80 in a divider, e.g., a digital counter, 35 to give the frequency f$_{LO/80}$. This output is coupled into a single pole double throw switch 37, the output of which is the input to a frequency to voltage converter 39 which is then coupled through a phase detector 41 and a switch 45 shown as being mechanically coupled to the switch 29 and again responsive to the signal to noise detector. Once again, an electronic switch could also be used herein with the two switches electrically coupled. The output of the phase detector and low pass filter 41 is thus coupled through the switch 45 to a second summing junction 19a receiving its other input from the tachometer 15. The switch 37, which again will preferably be a semi-conductor switch, along with the phase detector in the phase detector and low pass filter unit 41 are driven by a clock 47 operating at a relatively low frequency, 100 HZ, for example. Switching at the input and coupling through the converter 39 and phase detector 41 results in an output signal in analog form representative of the error between the input frequencies f'$_T$ and f$_{LO/80}$. This error signal designated e' is summed with the output of the tachometer 15 at the summing junction 19a and thus corrects the output of the frequency of voltage converter 21 which has a range of from zero to ten KHZ and the frequency output f'$_T$ of which represents the sensed velocity.

Figure 3:
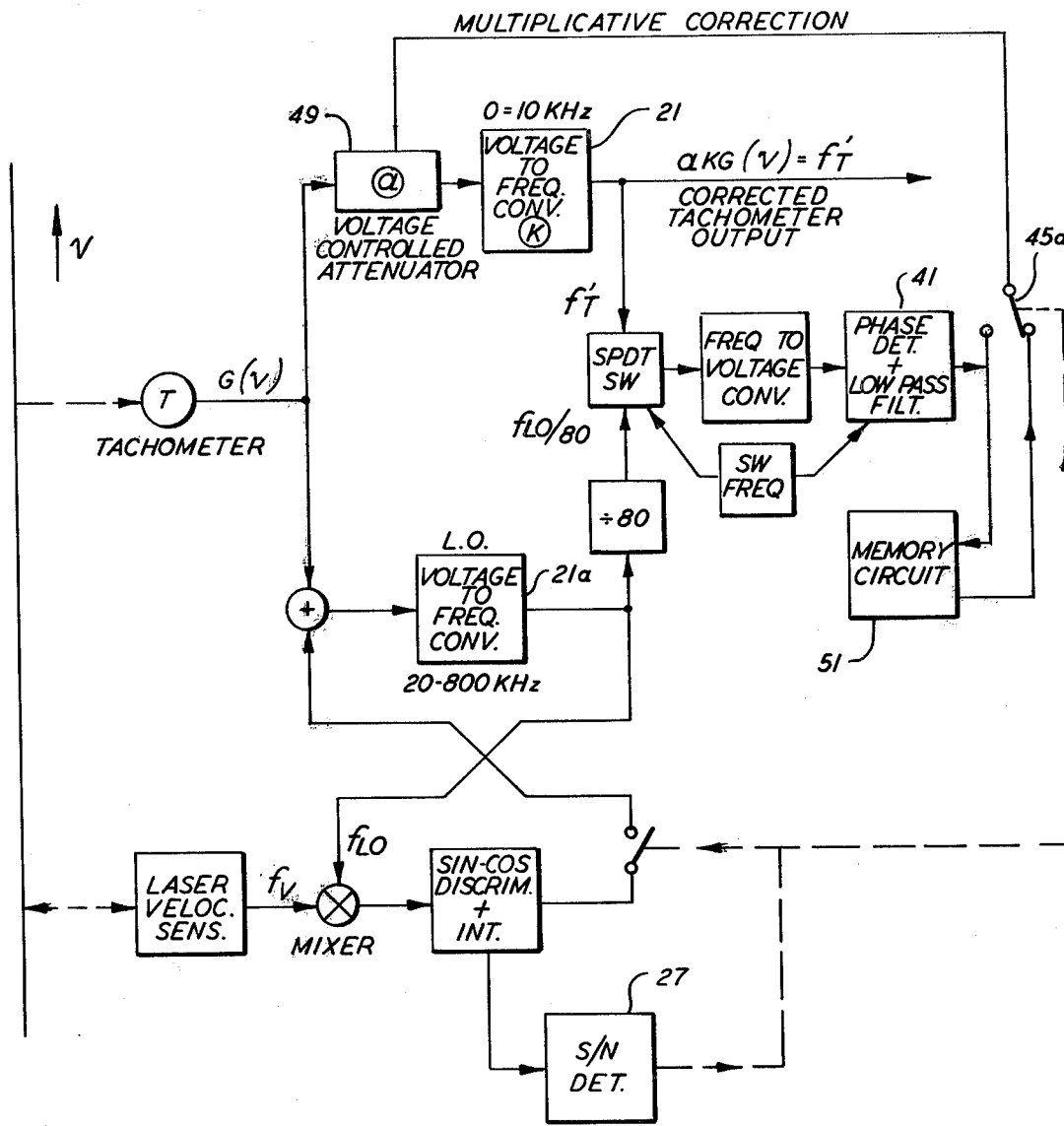
FIG. 3 is a diagram similar to FIG. 3 showing operation with a multiplicative correction.

FIG. 3 shows a modification of the circuit of FIG. 2. Rather than using an additive correction as in FIG. 2, it uses a multiplicative correction. The only differences in this circuit as compared to the circuit of FIG. 2. is that the summing junction 19a is replaced by a voltage controlled attenuator 49. The voltage controlled attenuator in normal operation obtains its input from the phase detector and low pass filter 41. However, upon operation of the signal to noise detector 27, it is switched to the output of a memory circuit 51. Memory circuit 51, which may be a sample and hold type circuit continuously samples the output of the phase detector and provides an output equal thereto. In the case of dropout during a run, the signal to noise detector 27 responds causing the switch 45a, which is now a single pole double throw switch, to connect the memory circuit 51 to supply its output to the voltage controlled attenuator 49. This results in a corrected output frequency f'$_T$ which is equal to AKG [v]. Again, because of the closed loop, the output of the phase detector and low pass filter 41 adjusts itself so as to provide a multiplicative correction to the voltage control attenuator which will result in the output of the voltage to frequency converter 21 equaling the divided output frequency of the voltage to frequency converter 21a.

The use of a multiplicative correction has a number of advantages. The additive correction of FIGS. 1 and 2 is a bias type error correction, whereas the multiplicative correction of FIG. 3 is a slope error correction. FIGS. 1 and 2 did not illustrate any provision for memory. Such a provision would be possible, for example, by providing a memory circuit like that of FIG. 3 at the output of the sine-cosine discriminator 25 coupled to switch 29 or in the case of FIG. 2 in the same location as in FIG. 3. However, it must be remembered that additive corrections vary with speed so that a fixed correction is valid only a particular speed. As the speed goes to zero, in fact, a last remembered additive correction would cause an ever increasing error. Such a remembered error would be useful in the case of velocimeter dropout, assuming the speed remained essentially constant. However, with dropout and a significant speed change, such an error correction would not be valid and could increase rather than decrease error. Thus, if such a correction is used with the embodiment of FIGS. 1 and 2, additional means must be provided to ensure that the remembered correction is only applied so long as there is a dropout and no significant speed change. This, of course, would require additional detection circuits to determine when and where not to use the correction. The multiplicative correction of FIG. 3, in contrast, provides a fixed value which is valid over a range of speeds. Using such a correction, as the speed drops down to zero, one would get a true zero output. In the case of dropout the last remembered multiplicative error correction to the tachometer very likely is beneficial to retain. However, it should be noted that mechanical slippage and tachometer non-linearity will limit the range of speed over which a fixed multiplicative correction remains accurate.

What is claimed is:

1. A velocimeter for measuring relative motion between a body upon which the velocimeter is fixed and a surface comprising:
   (a) a laser velocimeter sensor directed at said surface and providing a first frequency output;
   (b) a tachometer mechanically coupled to measure said relative motion;
   (c) a first voltage to frequency converter receiving as an input the output of said tachometer;
   (d) a mixer receiving as inputs the output of said laser velocimeter sensor and the output of said first voltage to frequency converter and providing an output;
   (e) a sine-cosine discriminator and integrator having the output of said mixer as an input and providing as an output an analog signal representing the frequency error between said two frequency signals;
   (f) a signal to noise detector for detecting the quality of the signal in said discriminator;
   (g) summing means at the input of said first voltage to frequency converter having as one input said tachometer output; and
   (h) a switch responsive to said signal to noise detector to couple the output of said sine-cosine discriminator and integrator as a second, correction input to said summing means to correct the output signal of said tachometer only when the signal to noise ratio is above a predetermined threshold.

2. Apparatus according to claim 1 and further including:

a second voltage to frequency converter also having an output of said tachometer coupled to the input thereof, having an operating range which is a fraction of the frequency range of said first voltage to frequency converter;

means to divide the output of said first voltage to frequency converter by said multiple;

means to compare the output of said means to divide with the output of said second voltage to frequency converter to develop a signal representing the difference in frequency there between;

means for correcting coupled to the input of said second voltage to frequency converter having as one input said tachometer output; and a second switch, coupled to operate with said first switch, coupling the output of said means to compare to said means for correcting.

3. Apparatus according to claim 2 wherein said means to compare comprises:
(a) a single pole double throw switch having as inputs the output of said second voltage to frequency converter and said means to divide;
(b) a frequency to voltage converter having the output of said switch as an input;
(c) a phase detector and low pass filter having the output of said frequency to voltage converter as an input and providing its output to said second switch; and
(d) a clock for driving said switch and for providing a reference input to said phase detector and low pass filter.

4. Apparatus according to claim 3 wherein said means for correcting comprise means to add the output of said means to compare to said tachometer signal.

5. Apparatus according to claim 3 wherein said means for correcting comprise means to multiply said tachometer signal by the output of said means to compare.

6. Apparatus according to claim 5 wherein said means to multiply comprise a variable resistance device.

7. Apparatus according to claim 3 and further including means to store the output of said means to compare and wherein said second switch is adapted to couple said means to store to the output of said means to compare when said switch is closed and to couple the output of said means to store to said means for correcting when said switch is open.

8. Apparatus according to claim 7 wherein said means for correcting comprise means to multiply said tachometer signal by the output of said means to compare.

9. A method of accurately measuring relative motion with respect to a surface comprising:
(a) disposing a laser velocimeter sensor so as to be directed at the surface, the laser velocimeter providing a first frequency output proportional to relative motion;
(b) coupling a tachometer to measure the relative motion of said surface;
(c) converting the output of said tachometer to a frequency proportional to said relative motion; and
(d) using the output of said laser velocimeter sensor to correct the output of said tachometer whenever relative velocity is below a pre-determined value which is the minimum at which said laser velocimeter sensor operates properly, whereby the accuracy of the laser velocimeter sensor is obtained but the problems associated therewith at low or zero velocity and due to dropout are avoided.

* * * * *